(12) United States Patent
Matsunaga et al.

(10) Patent No.: US 8,460,448 B2
(45) Date of Patent: Jun. 11, 2013

(54) PRINTING INK DRYER AND PRINTING INK USING THE SAME

(75) Inventors: Shigeki Matsunaga, Ichihara (JP); Takanori Ohtsubo, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/635,349

(22) PCT Filed: Jun. 7, 2011

(86) PCT No.: PCT/JP2011/063004
§ 371 (c)(1),
(2), (4) Date: Sep. 14, 2012

(87) PCT Pub. No.: WO2011/158694
PCT Pub. Date: Dec. 22, 2011

(65) Prior Publication Data
US 2013/0074726 A1    Mar. 28, 2013

(30) Foreign Application Priority Data
Jun. 14, 2010    (JP) .................................. 2010-134974

(51) Int. Cl.
*C09D 11/02*    (2006.01)
*C09F 9/00*    (2006.01)

(52) U.S. Cl.
USPC .................. 106/31.34; 106/31.35; 106/31.66; 106/31.67; 106/310

(58) Field of Classification Search
USPC ............. 106/31.34, 31.35, 31.66, 31.67, 310, 106/264; 252/194; 554/71
See application file for complete search history.

(56) References Cited

U.S. PATENT DOCUMENTS

| | | | | |
|---|---|---|---|---|
| 4,631,087 | A * | 12/1986 | Turner | 106/310 |
| 5,922,117 | A * | 7/1999 | Malhotra et al. | 106/31.58 |
| 6,174,948 | B1 * | 1/2001 | Thames et al. | 524/398 |
| 6,428,613 | B1 * | 8/2002 | Matsunaga et al. | 106/310 |
| 7,682,440 | B2 * | 3/2010 | Wells et al. | 106/310 |
| 7,871,681 | B2 * | 1/2011 | Scholte et al. | 106/310 |

FOREIGN PATENT DOCUMENTS

| | | | |
|---|---|---|---|
| EP | 0750026 A1 | * | 12/1996 |
| JP | 06-172689 A | | 6/1994 |
| JP | 11-148033 A | | 6/1999 |
| JP | 11-323214 A | | 11/1999 |
| JP | 2000-026771 A | | 1/2000 |
| JP | 2001-049102 A | | 2/2001 |
| JP | 2006-222162 A | | 8/2006 |
| JP | 2009-221252 A | | 10/2009 |

OTHER PUBLICATIONS

International Search Report dated Sep. 6, 2011, issued for PCT/JP2011/063004.

* cited by examiner

*Primary Examiner* — Helene Klemanski
(74) *Attorney, Agent, or Firm* — Edwards Wildman Palmer LLP

(57) ABSTRACT

The present invention provides a printing ink dryer including a fatty acid manganese salt (A) and an aminoalcohol (B) represented by general formula (1) below. The printing ink dryer exhibits drying performance equivalent to or higher than the excellent drying performance possessed by cobalt metal carboxylates with using a smaller amount of a cobalt metal soap concerned about the influences on human bodies or without using the cobalt metal soap.

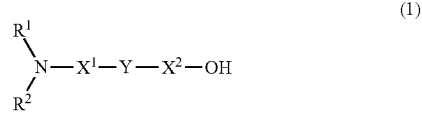

(1)

In the formula, $R^1$ and $R^2$ each independently represent a hydrogen atom or an alkyl group having 1 to 6 carbon atoms, $X^1$ and $X^2$ each independently represent an alkylene group having 2 to 6 carbon atoms, and Y represents $-NR^3-$, wherein $R^3$ represents a hydrogen atom or an alkyl group having 1 to 6 carbon atoms or an oxygen atom.

16 Claims, No Drawings

PRINTING INK DRYER AND PRINTING INK USING THE SAME

TECHNICAL FIELD

The present invention relates to a dryer serving as a drying accelerator for oxidative polymerization drying-type printing inks such as lithographic inks, and a printing ink using the dryer.

BACKGROUND ART

Dryers are added as drying accelerators for drying inks to oxidative polymerization drying-type printing inks such as lithographic inks. The dryers generally used for the inks include metal salts (may be abbreviated as "metal carboxylates" hereinafter) of various carboxylic acids with heavy metals, such as cobalt, manganese, lead, iron, zinc, and the like. Among these metal carboxylates, cobalt metal carboxylates have been used as principal drying accelerators because they have excellent drying performance.

The cobalt metal carboxylates have excellent drying performance, but have the problem that when they are used in a large mount for more shortening the drying time, drying of ink surfaces very rapidly proceeds, and wrinkling and shrivering occur due to skinning, thereby causing difficulty in satisfying both the short drying time and the prevention of wrinkling and shrivering due to skinning. Therefore, as a method for shortening the drying time while preventing wrinkling and shrivering due to skinning, a drying accelerator using a cobalt metal soap in combination with bipyridyl is proposed (refer to, for example, Patent Literature 1). The drying accelerator prevents wrinkling and shrivering due to skinning and has a short drying time and high drying performance. However, use of the cobalt metal carboxylates has the problem that cobalt compounds are concerned above carcinogenicity because they are listed in Group 2B "Possibly carcinogenic to humans" in the list of carcinogenic risks of the International Agency for Research on Cancer, and that the cobalt metal carboxylates are expensive because metallic cobalt is a rare metal and thus suffers from unstable supply. There is thus demand for a drying accelerator having high drying performance using the cobalt metal soap in a smaller amount.

Therefore, as a drying accelerator having high drying performance using a smaller amount of the cobalt metal soap, a drying accelerator containing a cobalt metal soap, a manganese metal soap, and at least one aminoalcohol selected from diethanolamine, diethylethanolamine, dibutylethanolamine, and n-butyldiethanolamine is proposed (refer to, for example, Patent Literature 2). However, the cobalt metal soap is still used, and thus the problem of concern about carcinogenicity, unstable supply of the raw material, and high cost cannot be resolved.

There is thus demand for a dryer (drying accelerator) which can further decrease the amount of cobalt metal soap used and has the high drying performance of having a short drying time and being capable of preventing wrinkling and shrivering due to skinning.

CITATION LIST

Patent Literature

PTL 1: Japanese Unexamined Patent Application Publication No. 6-172689

PTL 2: Japanese Unexamined Patent Application Publication No. 2001-49102

SUMMARY OF INVENTION

Technical Problem

A problem to be solved by the present invention is to provide a printing ink dryer which can further decrease the amount of use of a cobalt metal soap concerned about influences on human bodies and which has the high drying performance of having a short drying time and being capable of preventing wrinkling and shrivering due to skinning, the drying performance being equal to or higher than the excellent drying performance of a cobalt metal soap.

Solution to Problem

As a result of repeated intensive research, the inventors of the present invention found that the above problem can be solved by using a non-cobalt fatty acid manganese salt as a fatty acid metal salt in combination with a specified aminoalcohol, resulting in the achievement of the present invention.

The present invention relates to a printing ink dryer including a fatty acid manganese salt (A) and an aminoalcohol (B) represented by general formula (1) below, and to a printing ink using the dryer.

[Chem. 1]

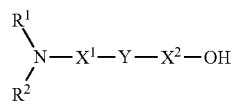

(1)

(In the formula, $R^1$ and $R^2$ each independently represent a hydrogen atom or an alkyl group having 1 to 6 carbon atoms, $X^1$ and $X^2$ each independently represent an alkylene group having 2 to 6 carbon atoms, and Y represents —$NR^3$— (wherein $R^3$ represents a hydrogen atom or an alkyl group having 1 to 6 carbon atoms) or an oxygen atom.)

Advantageous Effects of Invention

A printing ink dryer of the present invention resolves the problem of concern about carcinogenicity, unstable supply of a raw material, and high cost, and has the excellent drying performance of having a short drying time and being capable of preventing wrinkling and shrivering due to skinning, and the dryer is thus very useful as a dryer (drying accelerator) for lithographic inks.

DESCRIPTION OF EMBODIMENTS

A printing ink dryer of the present invention includes a fatty acid manganese salt (A) and an aminoalcohol (B) represented by general formula (1) below.

[Chem. 2]

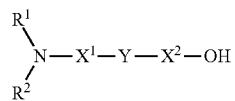

(1)

(In the formula, $R^1$ and $R^2$ each independently represent a hydrogen atom or an alkyl group having 1 to 6 carbon atoms, $X^1$ and $X^2$ each independently represent an alkylene group having 2 to 6 carbon atoms, and Y represents —$NR^3$— (wherein $R^3$ represents a hydrogen atom or an alkyl group having 1 to 6 carbon atoms) or an oxygen atom.)

The fatty acid manganese salt (A) is a manganese salt of a fatty acid, and examples of the fatty acid include octylic acid, naphthenic acid, neodecanoic acid, tung oil acid, linseed oil acid, soybean oil acid, resin acid, tall oil fatty acid, and the like. These fatty acid manganese salts (A) can be used alone or in combination of two or more.

The fatty acid manganese salt (A) can be produced by dissolving a fatty acid as a water-soluble salt, generally a sodium salt, in water, adding a water-soluble manganese salt to the resultant solution, performing ion exchange reaction referred to as "double decomposition", and then performing water-washing, dehydration, and filtration.

The aminoalcohol (B) is a compound represented by the general formula (1) below. In the present invention, use of the aminoalcohol having a structure of the general formula (1) can exhibit the excellent drying performance of having a short drying time and being capable of preventing wrinkling and shrivering due to skinning.
[Chem. 3]

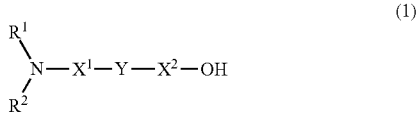

(In the formula, $R^1$ and $R^2$ each independently represent a hydrogen atom or an alkyl group having 1 to 6 carbon atoms, $X^1$ and $X^2$ each independently represent an alkylene group having 2 to 6 carbon atoms, and Y represents —$NR^3$— (wherein $R^3$ represents a hydrogen atom or an alkyl group having 1 to 6 carbon atoms) or an oxygen atom).

The aminoalcohol (B) represented by the general formula (1) preferably contains an alkylene group having 2 to 3 carbon atoms as each of $X^1$ and $X^2$ because it is possible to further shorten the drying time while more preventing wrinkling and shrivering.

Specific examples of the aminoalcohol (B) include 2-[(2-dimethylaminoethyl)methylamino]ethanol, 2-(2-aminoethyl)aminoethanol, 1-(2-aminoethyl)amino-2-propanol, 2-(3-aminopropylamino)ethanol, 2-(2-dimethylaminoethoxy)ethanol, and the like. These aminoalcohols (B) can be used alone or in combination of two or more.

In order to further improve the drying performance, the mixing ratio (A)/(B) by mass of the manganese metal in the fatty acid manganese salt (A) to the aminoalcohol (B) is preferably in the range of 1/0.1 to 1/30, more preferably in the range of 1/0.3 to 1/20, and still more preferably in the range of 1/0.5 to 1/10.

The printing dryer of the present invention is preferably used as a solution with good handleability, which is prepared by diluting the fatty acid manganese salt (A) and the aminoalcohol (B) with a diluent. Examples of the diluent include hydrocarbon solvents such as toluene, xylene, heptane, hexane, mineral spirits, and the like; alcohol solvents such as methanol, ethanol, propanol, cyclohexanol, and the like; ketone solvents such as methyl ethyl ketone, methyl isobutyl ketone, cyclohexanone, and the like; ether solvents such as propyl ether, methyl cellosolve, cellosolve, butyl cellosolve, methyl carbitol, and the like; fatty acid esters such as caproic acid methyl ester, capric acid methyl ester, lauric acid methyl ester, and the like; and vegetable fats and oils such as soybean oil, linseed oil, rape oil, safflower oil, and the like. Among these, a fatty acid ester (C) described below or vegetable fat and oil is preferred because of its high solubility of dryers such as metal carboxylates and good solubility in printing inks, and among the vegetable fats and oils, soybean oil which is also used as a diluent for printing inks is preferred. These diluents can be used alone or in combination of two or more.

In the present invention, the term "dryer" may represent a drying accelerator such as a metal soap or the like according to common use in manufacture of lithographic inks or represent a form that a metal soap used for manufacturing a printing ink is diluted with a diluent.

As the fatty acid ester (C) preferably used as the diluent in the printing ink dryer of the present invention, a fatty acid ester represented by general formula (2) below can be used.
[Chem. 4]

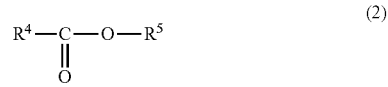

(In the formula, $R^4$ is an alkyl group having 5 to 11 carbon atoms, and $R^5$ is an alkyl group having 1 to 3 carbon atoms.)

The fatty acid ester (C) is produced by esterification reaction between a carboxylic acid having 6 to 12 carbon atoms and an alcohol having 1 to 3 carbon atoms, and the carbon chains of the carboxylic acid and the alcohol may be linear or branched.

Examples of the fatty acid ester (C) include caproic acid methyl ester, enanthic acid methyl ester, caprylic acid methyl ester, pelargonic acid methyl ester, capric acid methyl ester, lauric acid methyl ester, caproic acid ethyl ester, enanthic acid ethyl ester, caprylic acid ethyl ester, pelargonic acid ethyl ester, capric acid ethyl ester, lauric acid ethyl ester, caproic acid propyl ester, enanthic acid propyl ester, caprylic acid propyl ester, pelargonic acid propyl ester, capric acid propyl ester, lauric acid propyl ester, and the like. These fatty acid esters can be used alone or in combination of two or more. In addition, among these fatty acid esters, caproic acid methyl ester, capric acid methyl ester, and lauric acid methyl ester are preferred because of their little odors. In particular, lauric acid methyl ester is preferred because decreases in both the viscosity and the odor of the printing ink dryer can be achieved.

In order to produce the printing ink dryer having lower viscosity and excellent handleability, the mixing ratio [(A)+(B)]/(C) by mass of the total of the fatty acid manganese salt (A) and the aminoalcohol (B) to the fatty acid ester (C) is preferably in the range of 10/90 to 70/30, more preferably in the range of 20/80 to 60/40, and still more preferably in the range of 30/70 to 50/50.

A printing ink of the present invention is prepared by mixing the printing ink dryer. A printing ink generally includes varnish as a binder resin, a colorant as a pigment or dye, and a diluent for adjusting viscosity and drying property of the printing ink. Examples of the varnish include resins having an unsaturated fatty acid group, such as rosin-modified phenol resins, maleic acid-modified phenol resins, unsaturated polyesters, petroleum resins, alkyd resins, and the like. Examples of the colorant include carbon black, phthalocyanine pigments, red iron oxide, azo pigments, quinacridone pigments, and the like. Examples of the diluent include hydrocarbon solvents such as toluene, xylene, heptane, hexane, mineral spirits, and the like; alcohol solvents such as methanol, ethanol, propanol, cyclohexanol, and the like; ketone solvents such as methyl ethyl ketone, methyl isobutyl ketone, cyclohexanone, and the like; ether solvents such as propyl ether, methyl cellosolve, cellosolve, butyl cellosolve, methyl carbitol, and the like; fatty acid esters such as caproic acid methyl ester, capric acid methyl ester, lauric acid methyl ester, and the like; and vegetable fats and oils such as soybean oil, linseed oil, rape oil, safflower oil, and the like.

An example of a method for producing the printing ink of the present invention is a method of grinding the varnish, the colorant, the diluent solvent, the printing ink dryer of the present invention, and, if required, other additives such as wax and the like with a ink mill such as a three roll mill. In this case, the printing ink dryer of the present invention is preferably used as being diluted with the fatty acid ester (C) or vegetable fat or oil.

The amount of the printing ink dryer of the present invention mixed in the printing ink is preferably in the range of 0.001 to 1 part by mass and more preferably in the range of 0.01 to 0.5 parts by mass in terms of manganese atom relative to 100 parts by mass of varnish in the printing ink. In addition, if required, the printing ink of the present invention may be mixed with a metal carboxylates serving as a dryer other than manganese, such as iron, nickel, copper, zinc, zirconium, bismuth, cerium, calcium, or the like.

EXAMPLES

The present invention is described in further detail below by way of examples.

Example 1

A printing ink dryer (1) was prepared by dissolving 31 parts by mass of manganese octylate and 13 parts by mass of 2-[(2-dimethylaminoethyl)methylamino]ethanol in 56 parts by mass of lauric acid methyl ester.
[Preparation of Varnish]

Varnish (V) was prepared by heating, at 210° C. for 1 hour, 40 parts by mass of rosin-modified phenol resin ("Beckacite F8301" manufactured by DIC Corporation), 50 parts by mass of soybean oil ("Soybean salad oil (S)" manufactured by Nisshin Oillio Group, Ltd.), 10 parts by mass of soybean oil fatty acid methyl ester ("Toeol 3120" manufactured by Toei Chemical Co., Ltd.), and 0.3 parts by mass of aluminum chelate ("Alumichelate" manufactured by Hope Chemical Co., Ltd.).
[Preparation of Evaluation Ink]

The printing ink dryer (1) and varnish prepared as described above were used and mixed in mixing amounts described below and then ground with a three-roll mill to prepare an evaluation ink. In addition, "Fastogen Blue-TGR-L" manufactured by DIC Corporation was used as a phthalocyanine blue pigment, and "Soybean salad oil (S)" manufactured by Nisshin Oillio Group, Ltd. was used as soybean oil.

| | |
|---|---|
| Varnish (V) | 65.5 parts by mass |
| Phthalocyanine blue pigment | 16 parts by mass |
| Soybean oil | 17 parts by mass |
| Printing ink dryer | 2 parts by mass |

[Measurement of Drying Time]

The ink prepared as described above was applied to a glass plate using a 1.5-mil applicator and then tested with a drying time recorder ("Model No. 404" manufactured by Taiyu Kizai Co., Ltd.). Measurement was conducted in a constant-temperature and humidity room (25° C. and 50% RH). The ink drying time was defined as the time taken until a scratch, which was produced by a needle of the drying time recorder at the start of drying of the ink, disappeared by complete drying after the ink was applied to the glass plate.
[Measurement of Skinning Time]

In a container having a diameter of 45 mm, 20 g of the ink prepared as described above was placed and stored in an atmosphere of 45° C., and the surface of the ink was touched with a finger at intervals of 1 hour to determine the time when the ink no longer adhered to the finger as the skinning time.

For each of the printing ink dryers (2) to (15) prepared in Examples 2 to 6 and Comparative Examples 1 to 9 described below, an evaluation ink was prepared and then evaluated by measuring the drying time and skinning time as in Example 1.

Example 2

The printing ink dryer (2) was prepared by dissolving 31 parts by mass of manganese octylate and 10 parts by mass of 2-(2-aminoethyl)aminoethanol in 59 parts by mass of lauric acid methyl ester.

Example 3

The printing ink dryer (3) was prepared by dissolving 31 parts by mass of manganese octylate and 11 parts by mass of 1-(2-aminoethyl)amino-2-propanol in 58 parts by mass of lauric acid methyl ester.

Example 4

The printing ink dryer (4) was prepared by dissolving 31 parts by mass of manganese octylate and 3 parts by mass of 2-(3-aminopropylamino)ethanol in 66 parts by mass of lauric acid methyl ester.

Example 5

The printing ink dryer (5) was prepared by dissolving 31 parts by mass of manganese octylate and 12 parts by mass of 2-(2-dimethylaminoethoxy)ethanol in 57 parts by mass of lauric acid methyl ester.

Example 6

The printing ink dryer (6) was prepared by dissolving 31 parts by mass of manganese octylate and 3 parts by mass of 2-(2-dimethylaminoethoxy)ethanol in 66 parts by mass of soybean oil ("Soybean salad oil (S)" manufactured by Nisshin Oillio Group, Ltd.).

Comparative Example 1

The printing ink dryer (7) was prepared by dissolving 41 parts by mass of manganese octylate and 9 parts by mass of cobalt borate neodecanoate in 50 parts by mass of oleic acid methyl ester.

Comparative Example 2

The printing ink dryer (8) was prepared by dissolving 31 parts by mass of manganese octylate in 69 parts by mass of oleic acid methyl ester.

Comparative Example 3

The printing ink dryer (9) was prepared by dissolving 31 parts by mass of manganese octylate and 14 parts by mass of 2,2'-bipyridyl in 55 parts by mass of oleic acid methyl ester.

Comparative Example 4

The printing ink dryer (10) was prepared by dissolving 31 parts by mass of manganese octylate and 7 parts by mass of 3-aminopropanol in 62 parts by mass of lauric acid methyl ester. Since gelation occurred in the printing ink dryer (10), the drying time and skinning time described below were not measured.

Comparative Example 5

The printing ink dryer (11) was prepared by dissolving 31 parts by mass of manganese octylate and 7 parts by mass of 2-methylaminoethanol in 62 parts by mass of lauric acid methyl ester.

Comparative Example 6

The printing ink dryer (12) was prepared by dissolving 31 parts by mass of manganese octylate and 8 parts by mass of 2-dimethylaminoethanol in 61 parts by mass of lauric acid methyl ester.

Comparative Example 7

The printing ink dryer (13) was prepared by dissolving 31 parts by mass of manganese octylate and 11 parts by mass of 2-diethylaminoethanol in 58 parts by mass of lauric acid methyl ester.

Comparative Example 8

The printing ink dryer (14) was prepared by dissolving 31 parts by mass of manganese octylate and 3 parts by mass of 2-n-butylaminoethanol in 66 parts by mass of lauric acid methyl ester.

Comparative Example 9

The printing ink dryer (15) was prepared by dissolving 31 parts by mass of manganese octylate and 15 parts by mass of 2,2'-n-butylaminodiethanol in 54 parts by mass of lauric acid methyl ester.

Table 1 shows the structural formulae of the aminoalcohols used in the printing ink dryers prepared in Examples 1 to 5 and Comparative Examples 4 to 9.

TABLE 1

| | Compound name | Structural formula |
|---|---|---|
| Example 1 | 2-[(2-Dimethylaminoethyl)methylamino]ethanol | |
| Example 2 | 2-(2-Aminoethyl)aminoethanol | |
| Example 3 | 1-(2-Aminoethyl)amino-2-propanol | |
| Example 4 | 2-(3-Aminopropylamino)ethanol | |
| Example 5 | 2-(2-Dimethylaminoethoxy)ethanol | |
| Comparative Example 4 | 3-Aminopropanol | |
| Comparative Example 5 | 2-Methylaminoethanol | |
| Comparative Example 6 | 2-Dimethylaminoethanol | |
| Comparative Example 7 | 2-Diethylaminoethanol | |
| Comparative Example 8 | 2-N-butylaminoethanol | |

TABLE 1-continued

| Compound name | Structural formula |
|---|---|
| Comparative Example 9 — 2,2'-N-butylaminodiethanol | 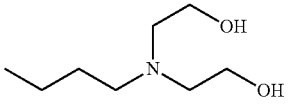 |

Tables 2 and 3 show the compositions and evaluation results of the printing ink dryers (1) to (15) prepared in Examples 1 to 6 and Comparative Examples 1 to 9.

TABLE 2

| | Printing ink dryer No. | Example 1 (1) | Example 2 (2) | Example 3 (3) | Example 4 (4) | Example 5 (5) | Example 6 (6) |
|---|---|---|---|---|---|---|---|
| Composition of printing dryer | Manganese octylate | 31 | 31 | 31 | 31 | 31 | 31 |
| | Cobalt borate neodecanoate | | | | | | |
| | 2-[(2-Dimethylaminoethyl) methylamino]ethanol | 13 | | | | | |
| | 2-(2-Aminoethyl) aminoethanol | | 10 | | | | |
| | 1-(2-Aminoethyl) amino-2-propanol | | | 11 | | | |
| | 2-(3-Aminopropylamino) ethanol | | | | 3 | | |
| | 2-(2-Dimethylaminoethoxy) ethanol | | | | | 12 | 3 |
| | Lauric acid methyl ester | 56 | 59 | 58 | 66 | 57 | |
| | Soybean oil | | | | | | 66 |
| Evaluation result | Drying time (hr) | 5.7 | 5.2 | 5.0 | 3.9 | 6.2 | 6.5 |
| | Skinning time (hr) | 6 | >7 | >7 | >7 | 6 | 6 |

TABLE 3

| | Printing ink dryer No. | Comp. Example 1 (7) | Comp. Example 2 (8) | Comp. Example 3 (9) | Comp. Example 4 (10) | Comp. Example 5 (11) | Comp. Example 6 (12) | Comp. Example 7 (13) | Comp. Example 8 (14) | Comp. Example 9 (15) |
|---|---|---|---|---|---|---|---|---|---|---|
| Composition of printing dryer | Manganese octylate | 41 | 31 | 31 | 31 | 31 | 31 | 31 | 31 | 31 |
| | Cobalt borate neodecanoate | 9 | | | | | | | | |
| | 3-Aminopropanol | | | | 7 | | | | | |
| | 2-Methylaminoethanol | | | | | 7 | | | | |
| | 2-Dimethylaminoethanol | | | | | | 8 | | | |
| | 2-Diethylaminoethanol | | | | | | | 11 | | |
| | 2-N-butylaminoethanol | | | | | | | | 3 | |
| | 2,2'-N-butylaminodiethanol | | | | | | | | | 15 |
| | 2,2'-Bipyridyl | | | 14 | | | | | | |
| | Lauric acid methyl ester | | | | | 62 | 62 | 61 | 58 | 66 | 54 |
| | Oleic acid methyl ester | 50 | 69 | 55 | | | | | | |
| Evaluation result | Drying time (hr) | 8.3 | 9.5 | 9.3 | Un-measured | 8.5 | 8.0 | 10.9 | 9.7 | 10.7 |
| | Skinning time (hr) | 3 | >7 | 4 | Un-measured | 5 | 5 | 6 | 6 | 6 |

The evaluation results shown in Table 2 revealed that the printing ink dryers of the present invention prepared in Examples 1 to 6 have short drying times and long skinning times and thus can suppress the occurrence of wrinkling and shrivering as compared with Comparative Example 1 using a cobalt metal soap. It was found from this result that the printing ink dryer of the present invention has very excellent drying performance without using a cobalt metal soap.

On the other hand, with respect to Comparative Examples 1 to 3 not using aminoalcohol, it was found that Comparative Examples 1 and 3 have short skinning times and cannot suppress the occurrence of wrinkling and shrivering. Also, it was found that Comparative Example 2 has a long skinning time and can suppress the occurrence of wrinkling and shrivering, but has a long drying time and a problem with drying performance.

Comparative Examples 4 to 9 are examples using aminoalcohol other than the aminoalcohol represented by the general formula (1). It was found that Comparative Example 4 has the problem of causing gelation during preparation of the dryer and cannot be used as a dryer. Also, it was found that comparative Examples 5 to 9 have long drying times, a problem with drying performance, and short skinning times, and cannot suppress the occurrence of wrinkling and shrivering.

The invention claimed is:

1. A printing ink dryer comprising a fatty acid manganese salt (A) and an aminoalcohol (B) represented by general formula (1) below:

[Chem. 1]

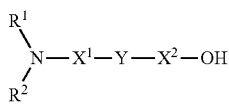

(1)

wherein $R^1$ and $R^2$ each independently represent a hydrogen atom or an alkyl group having 1 to 6 carbon atoms, $X^1$ and $X^2$ each independently represent an alkylene group having 2 to 6 carbon atoms, and Y represents —$NR^3$—, wherein $R^3$ represents a hydrogen atom or an alkyl group having 1 to 6 carbon atoms or an oxygen atom.

2. The printing ink dryer according to claim 1, wherein the aminoalcohol (B) is at least one selected from the group consisting of 2-[(2-dimethylaminoethyl)methylamino]ethanol, 2-(2-aminoethyl)aminoethanol, 1-(2-aminoethyl)amino-2-propanol, 2-(3-aminopropylamino)ethanol, and 2-(2-dimethylaminoethoxy)ethanol.

3. The printing ink dryer according to claim 1, wherein a fatty acid of the fatty acid manganese salt (A) is at least one selected from octyl acid, neodecanoic acid, and naphthenic acid.

4. The printing ink dryer according to claim 1, wherein the printing ink dryer is diluted with a fatty acid ester represented by general formula (2) below or a vegetable fat and oil:

[Chem. 2]

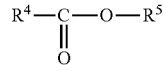

(2)

wherein $R^4$ represents an alkyl group having 5 to 11 carbon atoms, and $R^5$ represents an alkyl group having 1 to 3 carbon atoms.

5. A printing ink comprising the printing ink dryer according to claim 1.

6. The printing ink dryer according to claim 2, wherein a fatty acid of the fatty acid manganese salt (A) is at least one selected from octyl acid, neodecanoic acid, and naphthenic acid.

7. The printing ink dryer according to claim 2, wherein the printing ink dryer is diluted with a fatty acid ester represented by general formula (2) below or a vegetable fat and oil:

[Chem. 2]

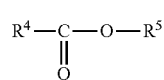

(2)

wherein $R^4$ represents an alkyl group having 5 to 11 carbon atoms, and $R^5$ represents an alkyl group having 1 to 3 carbon atoms.

8. The printing ink dryer according to claim 3, wherein the printing ink dryer is diluted with a fatty acid ester represented by general formula (2) below or a vegetable fat and oil:

[Chem. 2]

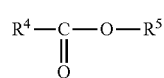

(2)

wherein $R^4$ represents an alkyl group having 5 to 11 carbon atoms, and $R^5$ represents an alkyl group having 1 to 3 carbon atoms.

9. The printing ink dryer according to claim 6, wherein the printing ink dryer is diluted with a fatty acid ester represented by general formula (2) below or a vegetable fat and oil:

[Chem. 2]

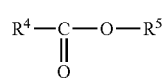

(2)

wherein $R^4$ represents an alkyl group having 5 to 11 carbon atoms, and $R^5$ represents an alkyl group having 1 to 3 carbon atoms.

10. A printing ink comprising the printing ink dryer according to claim 2.

11. A printing ink comprising the printing ink dryer according to claim 3.

12. A printing ink comprising the printing ink dryer according to claim 4.

13. A printing ink comprising the printing ink dryer according to claim 6.

14. A printing ink comprising the printing ink dryer according to claim 7.

15. A printing ink comprising the printing ink dryer according to claim 8.

16. A printing ink comprising the printing ink dryer according to claim 9.

* * * * *